United States Patent
Gast

(10) Patent No.: US 11,982,103 B2
(45) Date of Patent: May 14, 2024

(54) MULTIPLE BEARING LOCKING MECHANISM MODULE

(71) Applicant: James Mathias Gast, Gulf Breeze, FL (US)

(72) Inventor: James Mathias Gast, Gulf Breeze, FL (US)

(73) Assignee: Jetstraw Products LLC, Gulf Breeze, FL (US)

( * ) Notice: Subject to any disclaimer, the term of this patent is extended or adjusted under 35 U.S.C. 154(b) by 26 days.

(21) Appl. No.: 17/562,814

(22) Filed: Dec. 27, 2021

(65) Prior Publication Data

US 2023/0203839 A1    Jun. 29, 2023

(51) Int. Cl.
*E05B 15/00* (2006.01)
*F16C 29/10* (2006.01)

(52) U.S. Cl.
CPC ............ *E05B 15/006* (2013.01); *F16C 29/10* (2013.01)

(58) Field of Classification Search
CPC ........ F16C 29/10; E05C 19/009; E05C 19/04; E05C 19/26; E05C 19/16; E05C 17/56; E05B 15/006; E05B 15/0073; E05B 17/2011; E05B 63/121; E05B 67/365; E05B 67/383; E05B 47/00; E05B 47/004; E05B 47/0042; E05B 47/0045; E05B 73/0052; Y10T 292/14; Y10T 292/11
USPC ............ 70/20–22, 31, 35, 38 R, 38 A, 38 B, 70/38 C, 39, 57, 57.1, 292, 295, 386, 413
See application file for complete search history.

(56) References Cited

U.S. PATENT DOCUMENTS

| | | | |
|---|---|---|---|
| 6,047,575 A * | 4/2000 | Larson ...................... | G07C 1/32 70/38 A |
| 2020/0248481 A1* | 8/2020 | Melkovitz ........... | E05B 27/0003 |

* cited by examiner

*Primary Examiner* — Christine M Mills
*Assistant Examiner* — Yahya Sidky

(57) ABSTRACT

A multiple bearing locking mechanism module comprising driver bearings, track bearings, slidable boltlock blocks comprised of springs (or magnetic equivalent) and a crossbolt therein. One or more modules are controlled by a master boltlock bolt/vault either by axial or vertical movement depending on embodiment, thus compressing one or more driver bearings into the track bearings. The track bearings expand into the slidable boltlock blocks housing the crossbolt—slidably disposed in the bearing track—compressing the crossbolt into the bossbolt locking port, manifesting the locked state. The multiple bearing locking mechanism module can be encompassed in but not limited to, gate locks, safes, briefcases, toolboxes, toy boxes, multiple shackle padlocks, door locks, cable locks, et cetera.

17 Claims, 15 Drawing Sheets

MULTIPLE BEARING LOCKING MECHANISM MODULE

BACKGROUND OF THE INVENTION

1. Field of the Invention

The present invention relates to a multiple bearing locking mechanism (MBLM) module that comprises of a master boltlock locking method providing total lockability with multiple independent bossbolt locking ports encompassed in a multitude of apparatus embodiments.

2. Background of the Prior Art

The majority of locking mechanisms use a traditional lock-and-key method via a tumbler mortise system despite certain measures within a tumbler such as pins, wafers, wards, et cetera, entry into locks that use such mechanism are able to be put under tension and hence are well within the realm of possibility to be picked by novices. For this reason, this is the simplest way to attack a lock mechanism: unlocking it by picking the lock pin tumblers, hence gaining quick entry into your locked possession. Another common flaw of many locking mechanisms is the actuated movement that secures a lock point, for instance, a padlock shackle. These mechanisms use a rotatable cam shaft, being released by a key, combination, et cetera; the shackle legs often contain a bearing within a dimpled undercut usually on at least one of its shackle legs, when locked, this prevents the shackle legs from being released from the cavity of the said lock embodiment. However, this dimpled undercut enables the attacking of one side of the shackle legs via an angle grinder/bolt cutters/etc. because the bearing on the uncompromised side is able to be pushed aside when rotating the compromised end of the shackle, thus gaining quick access. Furthermore, because the tumbler mortise system is an open system, the internal mechanisms of most locks are typically not sealed, making them susceptible to be bombarded by the elements such as rain, dirt, et cetera, ultimately leading to the shortening of life of the locking mechanism. Additionally, most locking mechanisms are typically specialized for one purpose (for instance, a shackle only fits in a specific padlock), this limits the scope of these locks. Lastly, the majority of locking mechanisms consists of an extensive array of small and intricate parts that lead to tedious assembly. Ultimately, it is important to provide a locking mechanism that is able to provide superior security, modularity, and manufacturability.

SUMMARY

As mentioned above, the object of the invention is to provide superior security, modularity, and manufacturability. The present invention provides a means to replace the conventional tumbler mortise system with a master boltlock vault that removes rotational tension that is required for tumblers (and necessary for picking). The master boltlock vault utilizes a push/pull motion via a boltlock dimple key extruder which locks and unlocks the present invention; this system will be further explored in the detailed description. In further pursuit of security, the present invention uses crossbolts that drive through a crossbolt cavity and into the bossbolt locking port. This method of locking ensures that the crossbolt is "driven in" to the preferred bossbolt lockpoint cavity, now secured by the crossbolt say in this instance, a shackle, it is impossible to rotate in the scenario that one side is cut, ultimately requiring twice the time to gain access via forced entry.

In respect to modularity, the MBLM module provides unlimited options depending on the application and embodiment chosen, for instance, but not limited to padlocks, gate locks, multiple shackle padlocks, et cetera. In appreciation of modularity, different locking mechanisms can be used with the embodiments, such as the master boltlock vault or a traditional (rotational) tumbler (albeit at a cost of security); in fact in a peculiar case, a rope, cable, etc. that can properly fit through the master boltlock receiver cavity can lock the mechanism. This level of modularity ensures a wide range embodiments and applications that goes beyond the provided embodiments. Another benefit of modularity is that the MBLM module is a closed system. While the locking mechanism itself is an open system (to allow for a key to enter), the locking mechanism is separate from the module, preventing the elements from entering the internal mechanisms of the module, ensuring the longevity of the mechanism. Finally, another benefit of modularity is relative ease of manufacturing, as will become evident through the drawings, the MBLM modules comprise of relatively few parts to be assembled, making it significantly easier to manufacture. The present invention provides a number of benefits over traditional locking mechanisms through increased security with the boltlock vault over the traditional tumbler mortise. Providing increased modularity which enables a vast range of embodiments and the use of different locking mechanisms like the tumbler mortise (again at a cost of security relative to the master boltlock vault), and relatively few parts that eases manufacturing.

BRIEF DESCRIPTION OF DRAWINGS

1. Brief Description of Figures

The accompanying drawings illustrates one or more embodiments and/or aspects of the disclosure and together with the written description, serve to explain the principles of the disclosure wherever possible, the same reference numbers are used throughout the drawings to refer to the same or like elements of an embodiment wherein.

BRIEF DESCRIPTION OF PARTS/COMPONENTS

Figure 1:
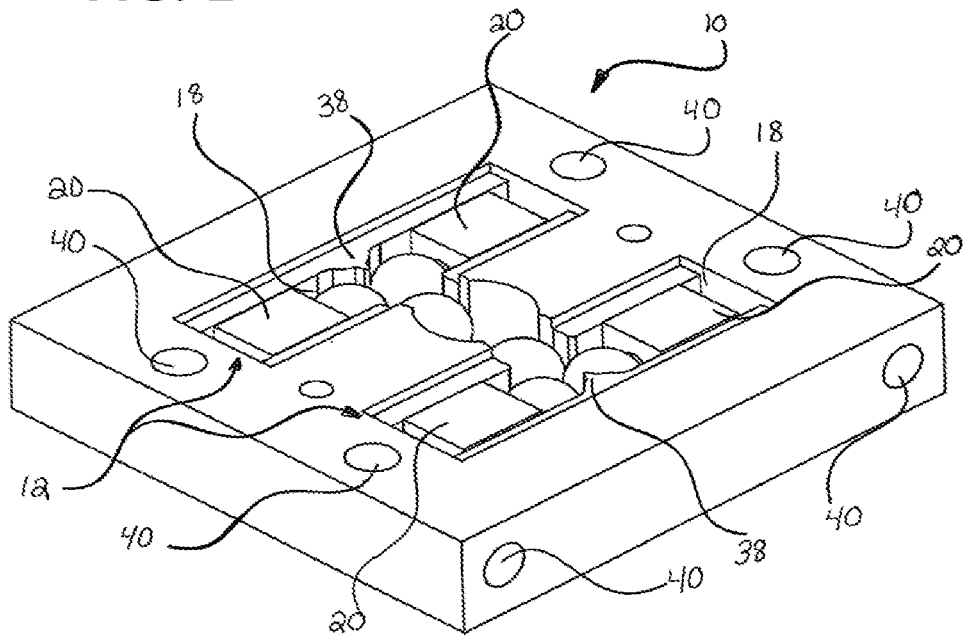
FIG. 1 illustrates a perspective view of a MBLM module embodiment.
Figure 2:
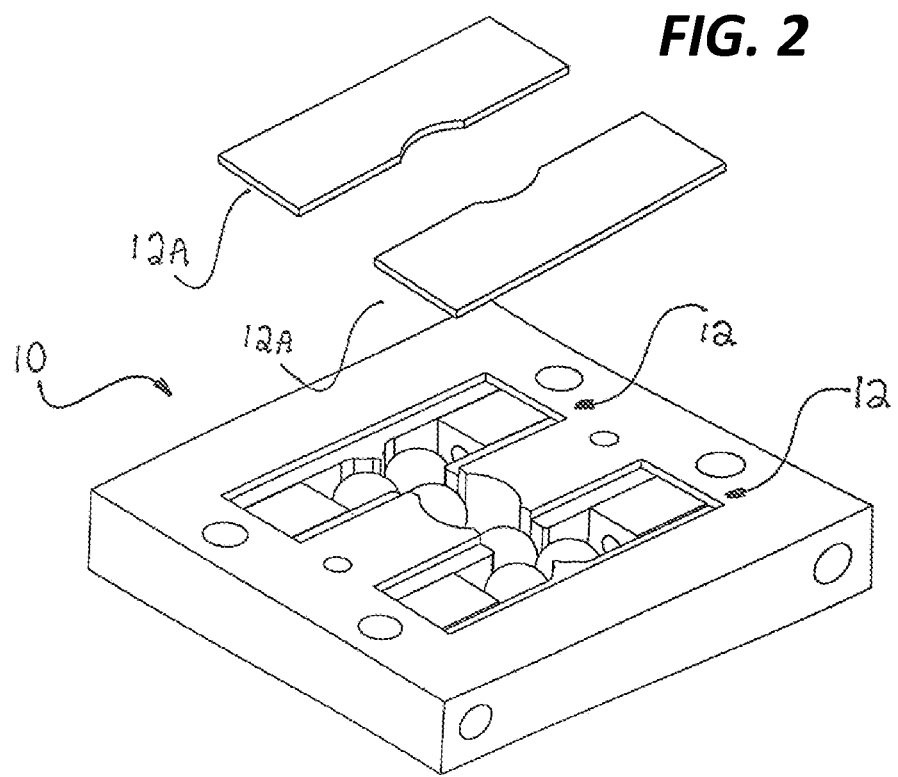
FIG. 2 illustrates a perspective exploded view of a MBLM module embodiments with module lids shown in the unlocked position.
Figure 2A:
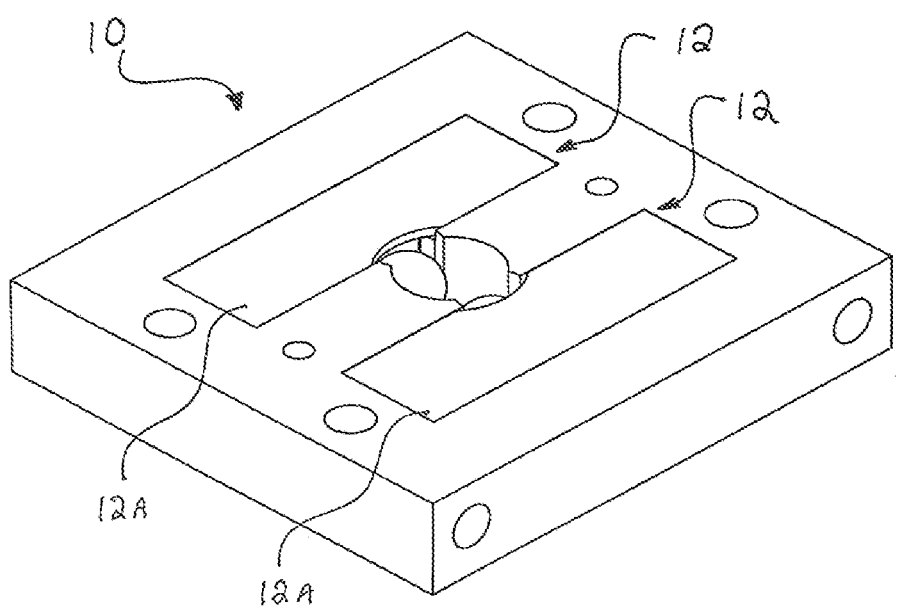
FIG. 2A illustrates a perspective view of a MLBM module embodiment with module lids shown.

10: Multiple Bearing Locking Mechanism
12: Module
12A: Module Lid
14: Track Bearings
16: Driver Bearings
18: Bearing Track
20: Slidable Boltlock Block
22: Crossbolt
24: Slidable Boltlock Block Fixed Magnet
26: Crossbolt Cavity Magnet
28: Slidable Boltlock Block Cavity
30: Crossbolt Cavity
32: Return Spring
34: Cavity Spring
36A: Magnetic Switch Diagram (A)
36B: Magnetic Switch Diagram (B)
38: Bearing Track Guide
40: Bossbolt Locking Port
42: Master Boltlock Receiver Cavity
44: Boltlock
44A: Boltlock Cavity
46: Mortise Lock
48: Master Boltlock Vault
48A: Master Boltlock Bolt (A)
48B: Master Boltlock Bolt (B)
48C: Master Boltlock Bolt (C)
48D: Master Boltlock Bolt (D)
48E: Master Boltlock Bolt (E)
48F: Master Boltlock Dimpled Lock Release
50: Bossbolt Lockpoint
50A: Bossbolt Shackle
50B: Beveled End
50C: Lock Catch
52: Bossbolt Lockpoint Cavity
54: Boltlock Dimple Key Extruder
54A: Push Button Bearing Release
54B: Push Button Spring
54C: Locking Bearings
54D: Bits for Security Pins
54E: Bits for Lock Pins
56: Vault Cover
58: Boltlock Driver
60: Boltlock Security Pins
62: Boltlock Lock Pins
64: Alignment Stop Guide
66: Magnet Placement Embodiment
68: Mortise Springs
70: Boltlock (Locked Position)
72: Boltlock (Unlocked Position)
74: Magnetic Switch Schematic
76: Magnetic Switch Apparatus
78: Apparatus Magnets

DETAILED DESCRIPTION

This detailed description describes embodiments of the invention illustrated in FIGS. 1 through 20D and does not intend to limit the scope of the claims in anyway, for the invention as claimed is broader than the provided embodiments; the terms used in the claims have their full ordinary meaning.

Additionally, while the exemplary embodiments described in the specification and illustrated in the drawings relate to the MBLM 10 module 12, it should be noted that the inventive features described herein may be applied to other types of embodiments like those seen in FIGS. 20A through 20D but also but not limited to locks for safes, luggage locks, briefcase locks, toy box locks, cable locks, gate locks, padlocks, multiple shackle padlocks, door locks, et cetera.

Further, while the present invention includes a number of methods for a locking mechanism, (e.g. the master boltlock vault 48 as present in FIGS. 6 through 9 and 17), the MBLM 10 module 12 is not limited to such mechanism and can use other locking mechanisms including but not limited to master boltlock bolt variants 48A-48E as seen in FIGS. 17A through 17E, tumbler key mortise, ropes, cables, et cetera. In furtherance of modularity, the mechanism is able to utilize either spring actuation or magnetic actuation, which will be showcased by the exemplary embodiments. Ultimately, the point is to showcase the vast modularity that the present invention provides not only in the quantity of potential locking mechanisms, but also applications. This will become more apparent.

Figure 3:
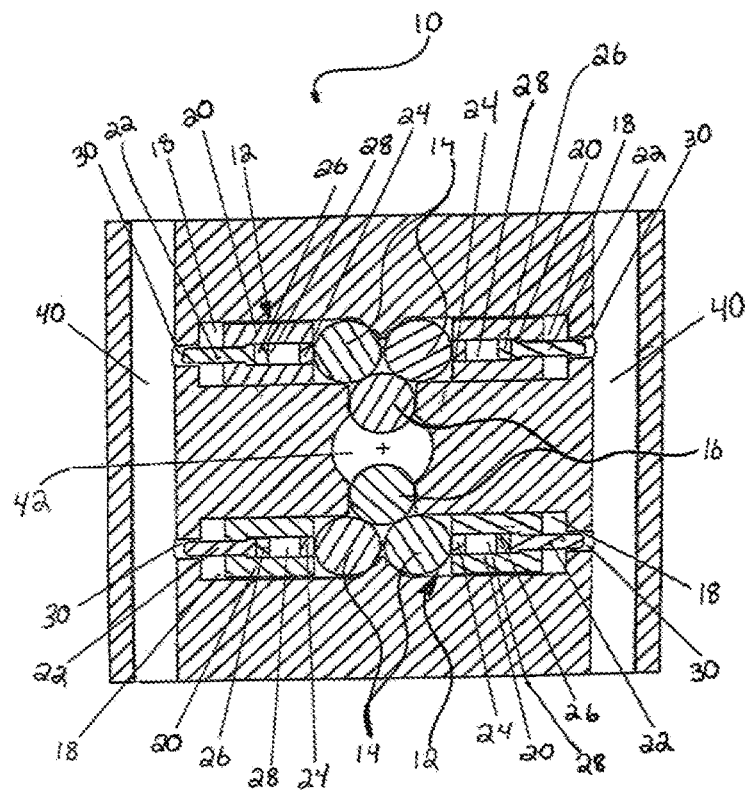
FIG. 3 illustrates a top view cross-sectional view of a MBLM module embodiment in the unlocked position.
Figure 3A:
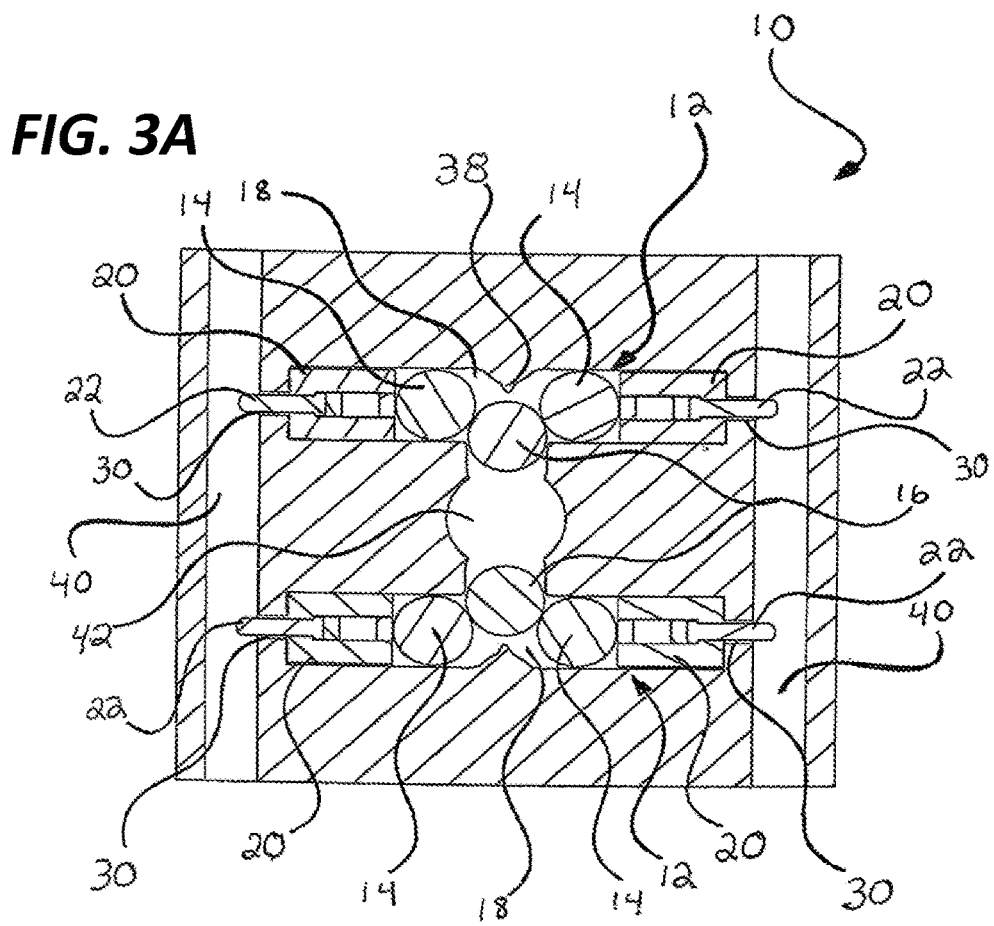
FIG. 3A illustrates a top view cross-sectional view of a MBLM module embodiment in the locked position.

In reference to FIGS. 1 through 3A, particularly the cross-sectional views of FIGS. 3 and 3A; a MBLM 10 module 12 comprises a lock body, wherein the module 12 comprises of a module lid 12A, one or more driver bearings 16 partly recessed in the master boltlock receiver cavity 42, track bearings 14 that are disposed within a bearing track 18 and partially separated by a bearing track guide 38, and slidable boltlock blocks 20 that directly contact the track bearings 14. These form the foundation of the MBLM 10 module 12.

Figure 4:
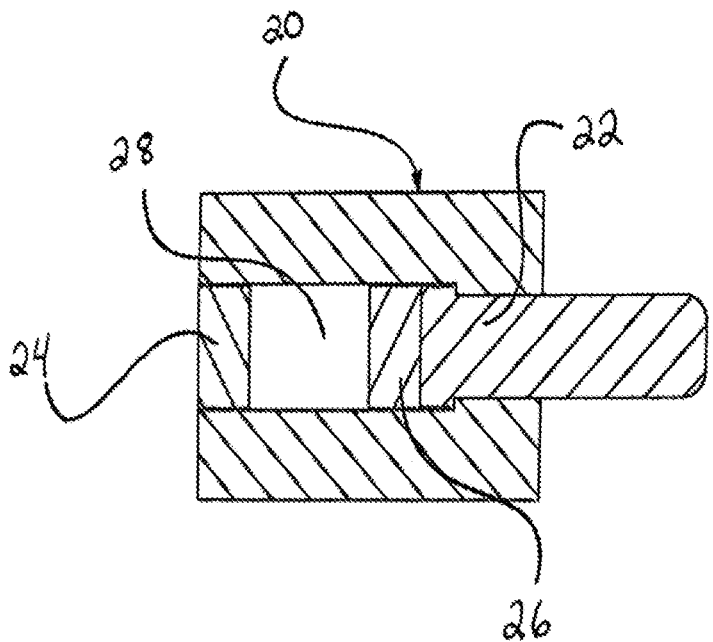
FIG. 4 illustrates a cross-sectional view of a slidable boltlock block that uses magnets to replicate spring action.

In further detail of the slidable boltlock block 20, refer to FIGS. 4 and 5, wherein the slidable boltlock block 20 comprises of a crossbolt 22, a method to actuate the crossbolt 22 within a slidable boltlock block cavity 28, and a method to return the slidable boltlock block 20 to its former position (locked to unlocked, which will be made clear). The aforementioned methods can either be actuated magnetically shown in FIG. 4 or spring-actuated shown in FIG. 5. In regard to FIG. 4, the slidable boltlock block 20 comprises two magnets of repelling poles: the slidable boltlock block fixed magnet 24 and the crossbolt cavity magnet 26. This composition in conjunction with apparatus magnets 78 (more on this later) actually serves both aforementioned methods, to reiterate: first to actuate the crossbolt 22 within the slidable boltlock block cavity 28 and second, to return the slidable boltlock block 20 to its unlocked position. In regard to FIG. 5, the slidable boltlock block 20 is comprised of a cavity spring 34 disposed in the slidable boltlock block cavity 28 which serves the first method of actuating the crossbolt 22 and a second method using the slidable boltlock block return spring 32, returning to its unlocked position.

Figure 5:
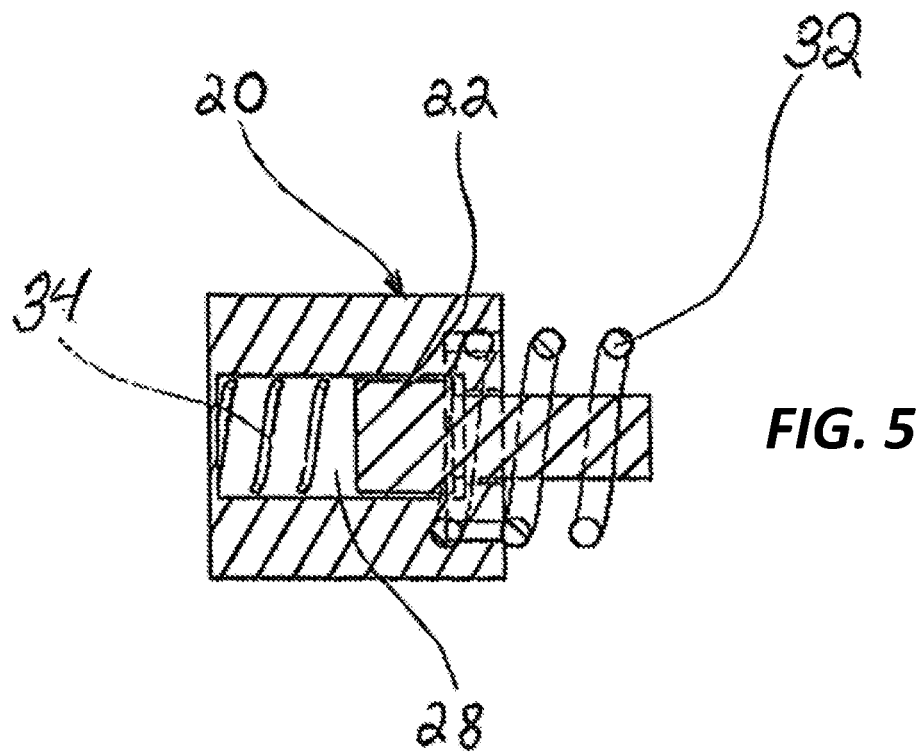
FIG. 5 illustrates a cross-sectional view of a slidable boltlock block that uses springs.

With respect to how the MBLM 10 module 12 locks and unlocks, it should be noted that the present invention has two methods of locking/unlocking: either magnetically (using the slidable boltlock blocks 20 as seen FIG. 4 in conjunction with apparatus magnets 78) or using springs (the slidable boltlock blocks 20 as seen in FIG. 5). The former will be discussed first:

Referring to FIGS. 3 and 3A, for explanation purposes, the MBLM 10 module 12 is initially in the unlocked state as seen in FIG. 3. In order to lock, the driver bearings 16 are first compressed by a locking mechanism not limited in scope (more on this later) located in the master boltlock receiver cavity 42, this pushes the driver bearings 16 into the track bearings 14. Then, in conjunction with the bearing track guide 38 the driver bearings 16 force the track bearings 14 to move transversely down the bearing track 18 this simultaneously pushes the slidable boltlock blocks 20. The crossbolts 22 that are actuated by the slidable boltlock block fixed magnet 24 and the crossbolt cavity magnet 26 are able to pass through the crossbolt cavity 30 and into the bossbolt locking port 40 which manifests the locked state as seen in FIG. 3A.

Figure 10:
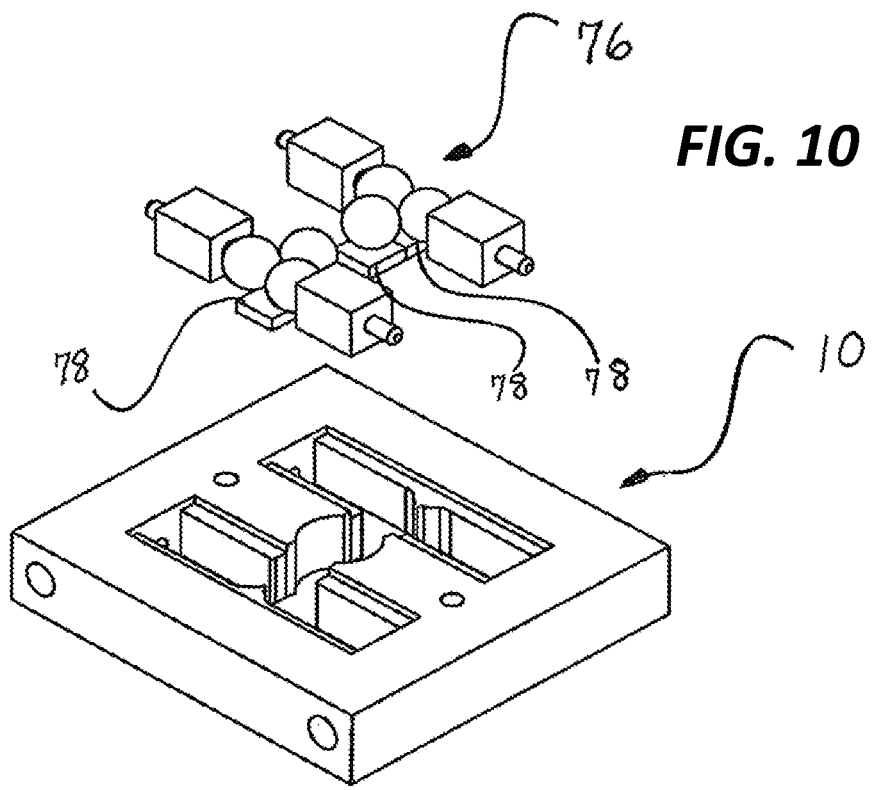
FIG. 10 illustrates an exploded view of a MBLM module embodiment.
Figure 11:
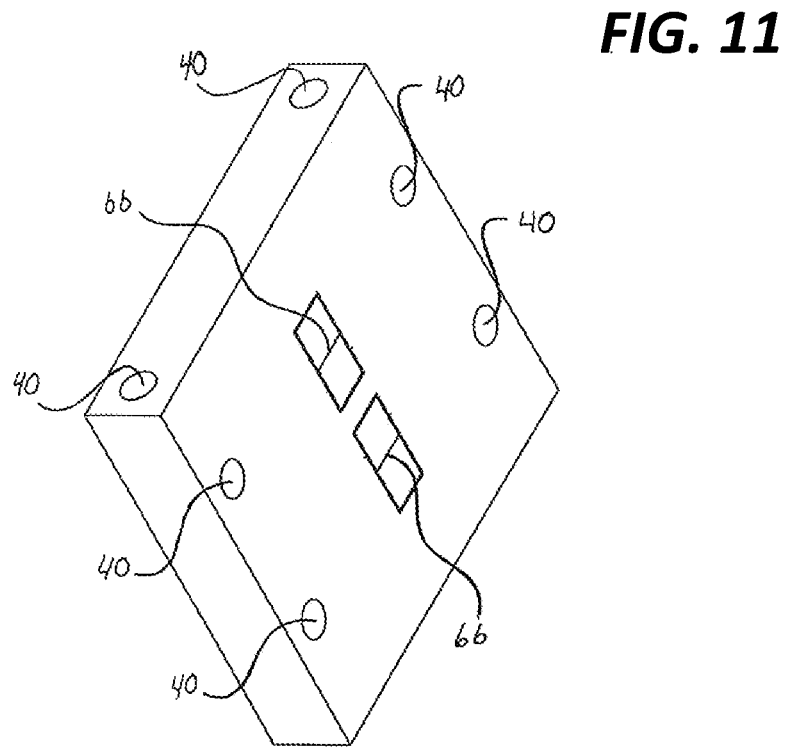
FIG. 11 illustrates a perspective view of the rear side of a MBLM module embodiment showcasing magnet placement.
Figure 12:
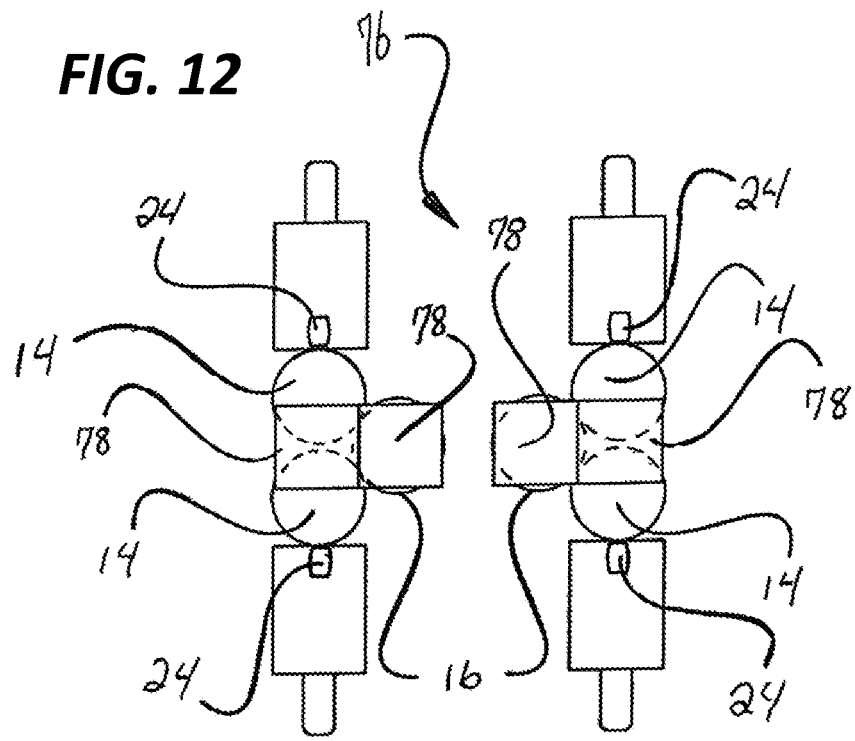
FIG. 12 illustrates a top-down view of the placement of driver bearings, track bearings, slidable boltlock block magnets and the magnet switch apparatus used in the MBLM module embodiment.
Figure 12:
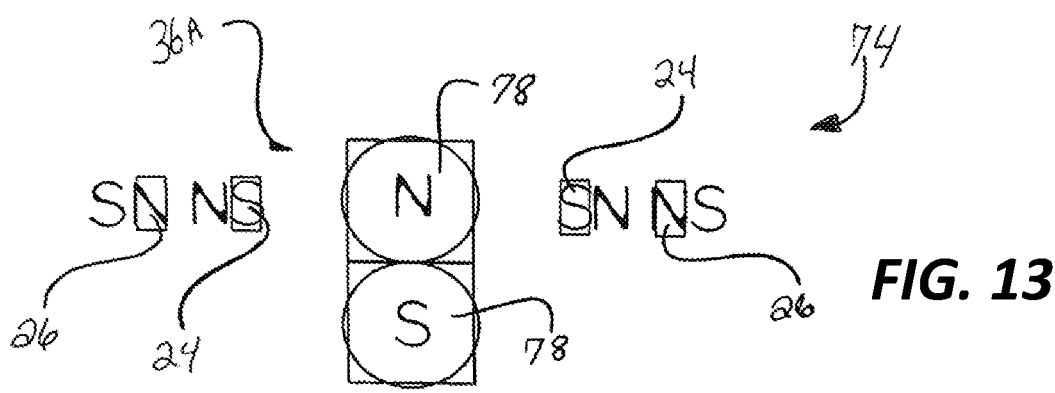
Figure 13:
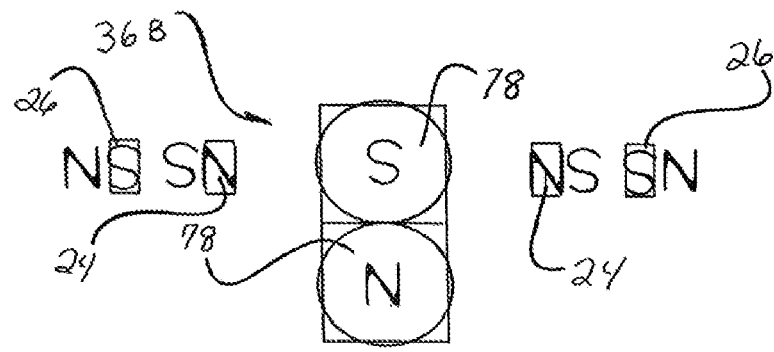
FIG. 13 illustrates a top-down view of the magnets' polarity, shapes, and placement using the magnetic switch diagram.

In order to unlock the mechanism the driver bearings 16 are released in the master boltlock receiver cavity 42 decompressed by the said locking mechanism, this is where the apparatus magnets 78 play their major role, referring to FIGS. 10 and 12 the magnetic switch apparatus 76 showcases the placement of the driver bearings 16, track bearings 14, slidable boltlock blocks 20 (and the crossbolt 22, slidable boltlock block fixed magnet 24 and the crossbolt cavity magnet 26) relative to each other. In regard to the apparatus magnets 78, they are specifically placed in the magnet placement embodiment 66 as seen in FIG. 11; additionally, the apparatus magnets 78 are not limited in scope by shape or size, as seen in FIG. 13, where circular apparatus magnets 78 superimpose rectangular apparatus magnets 78; it should be mentioned that the superimposed drawing only showcases the possibility of using a round shape (or other shape not limited in scope) and is not literally superimposed upon one another. Furthermore, FIG. 13 showcases the magnetic switch schematic 74 that is absolutely paramount to the functionality of returning the MBLM 10 module 12 to the unlocked state, more specifically, the magnetic switch schematic 74 showcases the required relative polarity needed, although it should be noted that the polarity is interchangeable as long as the interchanged orientation is consistent with all magnets (slidable boltlock block fixed magnets 24, crossbolt cavity magnets 26, and apparatus magnets 78) as seen with magnetic switch diagram (A) 36A and magnetic switch diagram (B) 36B. For all intents and purposes, either configuration as seen in magnetic switch diagram (A) 36A or magnetic switch diagram (B) 36B can be used in embodiments with multiple modules 12 (like those in FIGS. 3 and 3A); however, both modules 12 must use the same magnetic sequence (either both with magnetic switch diagram (A) 36A or both with magnetic switch diagram (B) 36B), more specifically, orientated as seen in FIGS. 10 and 12.

Ultimately the magnetic placement as seen in the magnetic switch schematic 74 and polarity as seen in either magnetic switch diagram (A) 36A or magnetic switch diagram (B) 36B allows for the driver bearings 16 to return to their former unlocked position due to the bearings' attraction to the apparatus magnets 78 and the slidable boltlock blocks' 20 attraction to the track bearings 14 via the slidable boltlock block fixed magnet 24 which allows for the track bearings 14 and slidable boltlock blocks 20 to be pulled back to their unlocked positions, this causes the crossbolts 22 to retract from the bossbolt locking port 40 and crossbolt cavity 30 manifesting the unlocked state as seen in FIG. 3.

Figure 20:
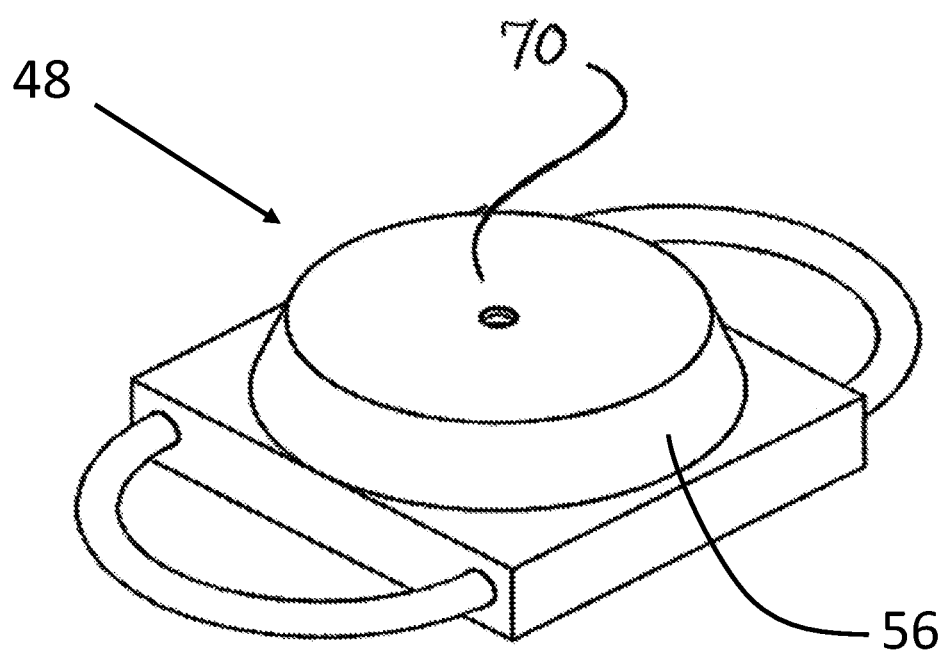
FIG. 20 illustrates a perspective view of a MBLM double shackle padlock embodiment in the locked position.
Figure 20A:
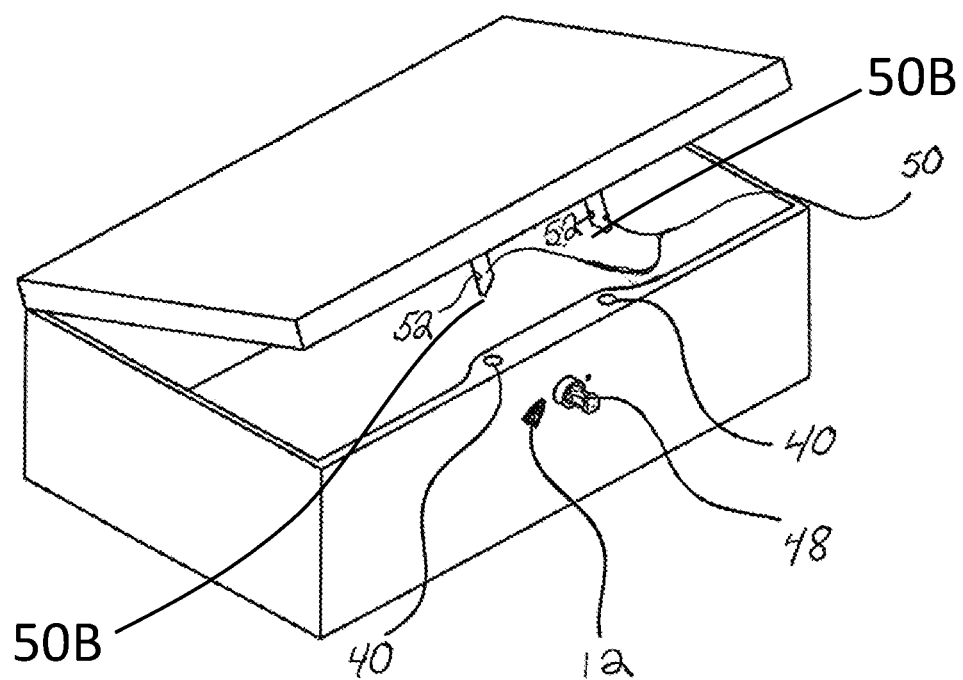
FIG. 20A illustrates a perspective view of an embodiment used in locking a chest.
Figure 20B:
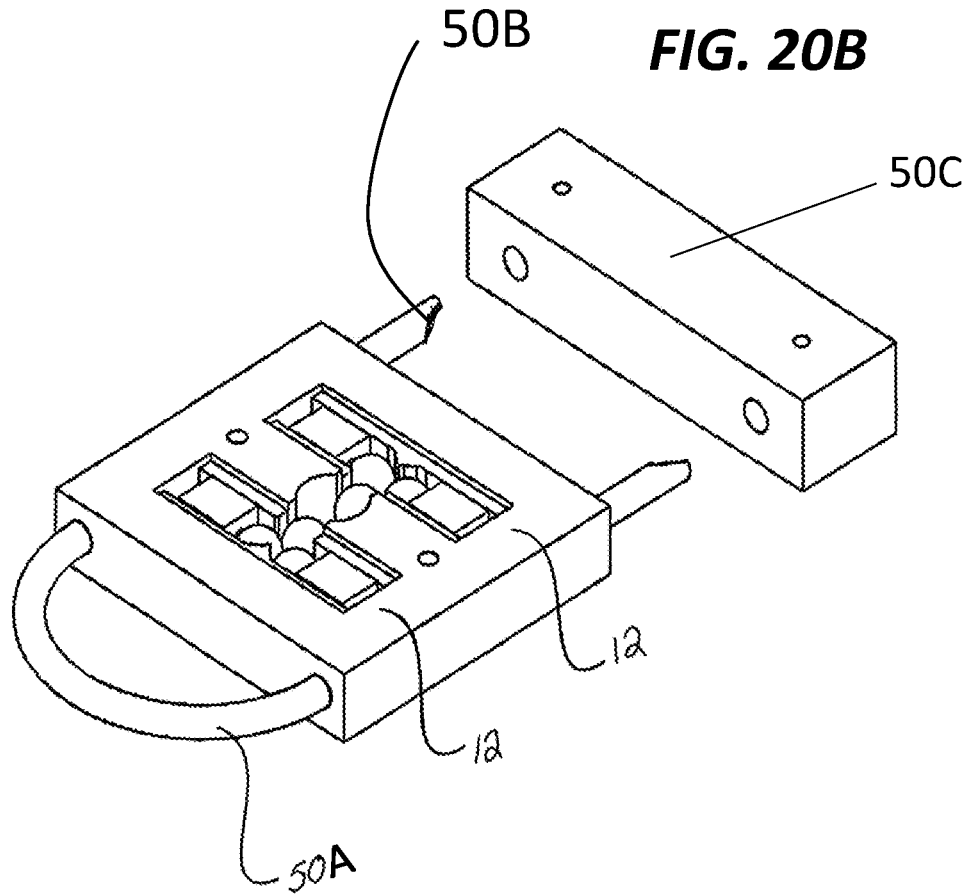
FIG. 20B illustrates a perspective view of an embodiment used in locking gates.
Figure 20C:
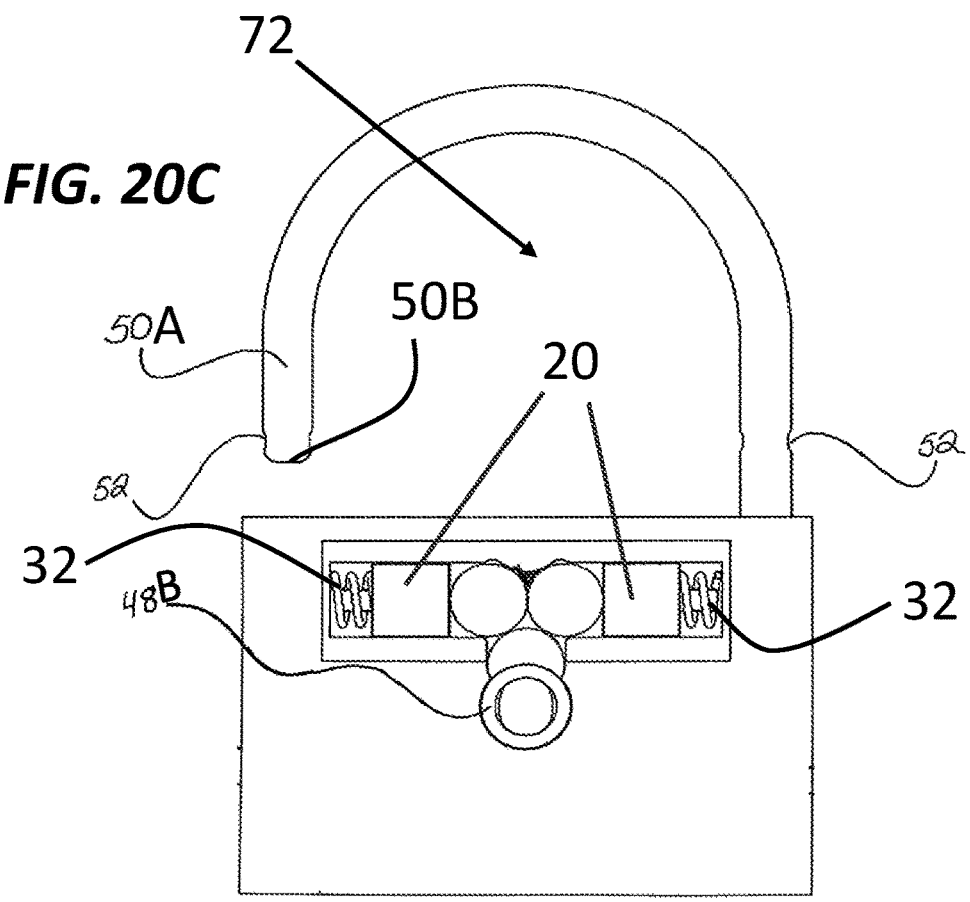
FIG. 20C illustrates a perspective view of an embodiment of a single shackle padlock.

In regard to the spring-actuated variation refer to FIG. 20C, which showcases a single shackle padlock embodiment that utilizes a master boltlock bolt (B) 48B as a simple locking mechanism (more on this later) which resides in the master boltlock receiver cavity 42. To lock the MBLM 10 module 12, rotate the master boltlock bolt (B) 48B, this compresses the driver bearing 16 which pushes into the track bearings 14 which in conjunction with the bearing track guide 38 the driver bearing 16 force the track bearings 14 to move transversely down the bearing track 18 thus simultaneously pushes the slidable boltlock blocks 20. The crossbolts 22 that are actuated by the cavity spring 34 are able to pass through the crossbolt cavity 30 and into the bossbolt locking port 40, manifesting the locked state. As made apparent, the process is fundamentally identical to the magnetic variation (except the actuation of the crossbolt 22); however, unlocking is simpler: further rotation of the master boltlock bolt (B) 48B decompresses the driver bearing 16 but instead of being attracted to the apparatus magnets 78, the return spring 32 on the slidable boltlock blocks 20 provides the force needed to push itself medially forcing the track bearings 14 into the driver bearing 16, pushing the driver bearing 16 into the master boltlock receiver cavity 42, manifesting the unlocked state.

The MBLM 10 module(s) 12 can be secured by multiple locking methods not limited in scope. The master boltlock vault 48 is keyed with the boltlock dimple key extruder 54 using a vertical pull method to release the boltlock 44 from the mortise lock 46 as seen in FIGS. 6 through 9.

Figure 14:
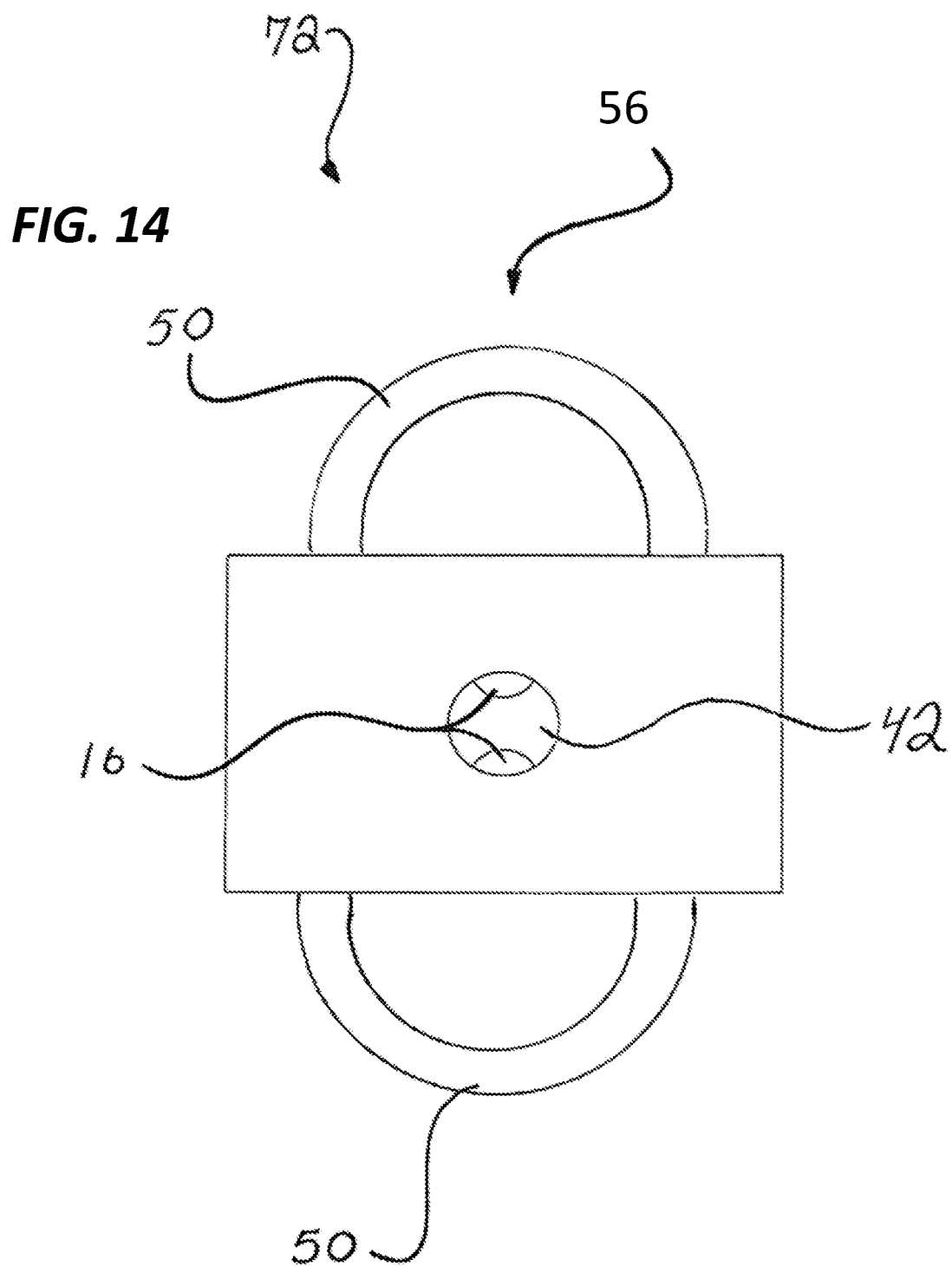
FIG. 14 illustrates a top-down view of the MBLM module double shackle padlock embodiment in an unlocked position whose master boltlock receiver cavity is open all the way through the lock body.
Figure 15:
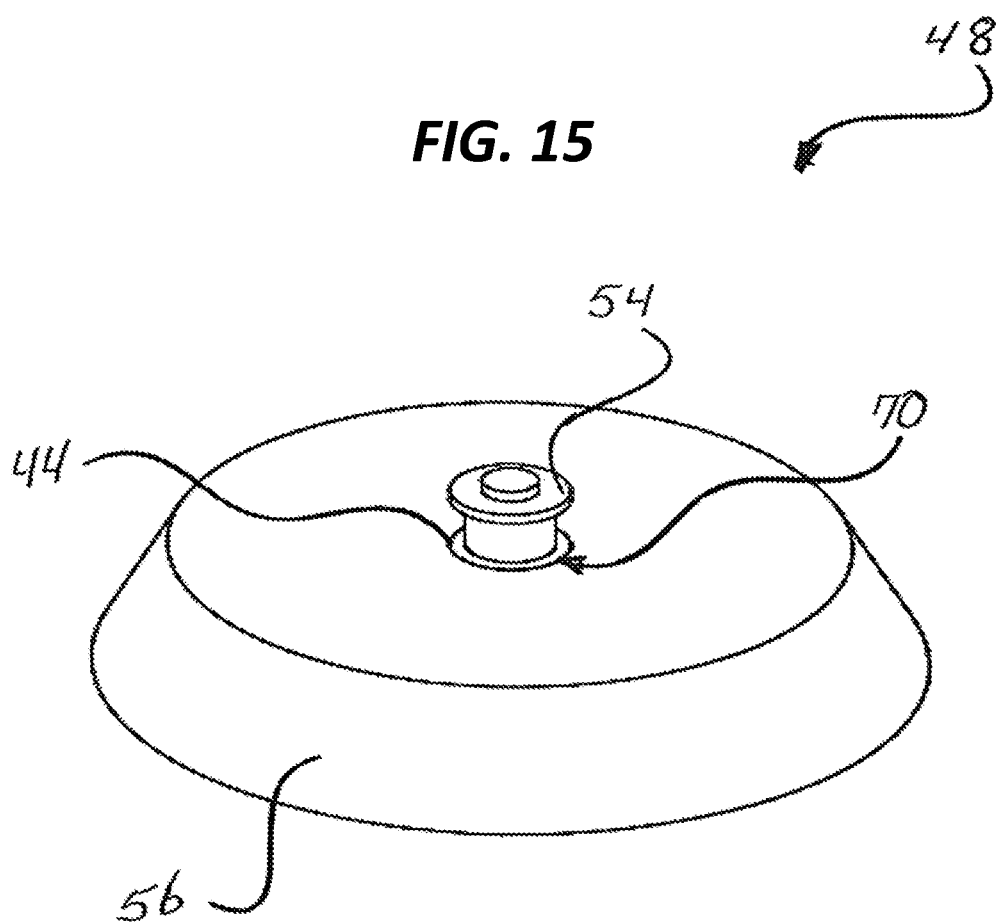
FIG. 15 illustrates a partial view of the MBLM module master boltlock vault in the vault cover in the locked position.
Figure 20D:
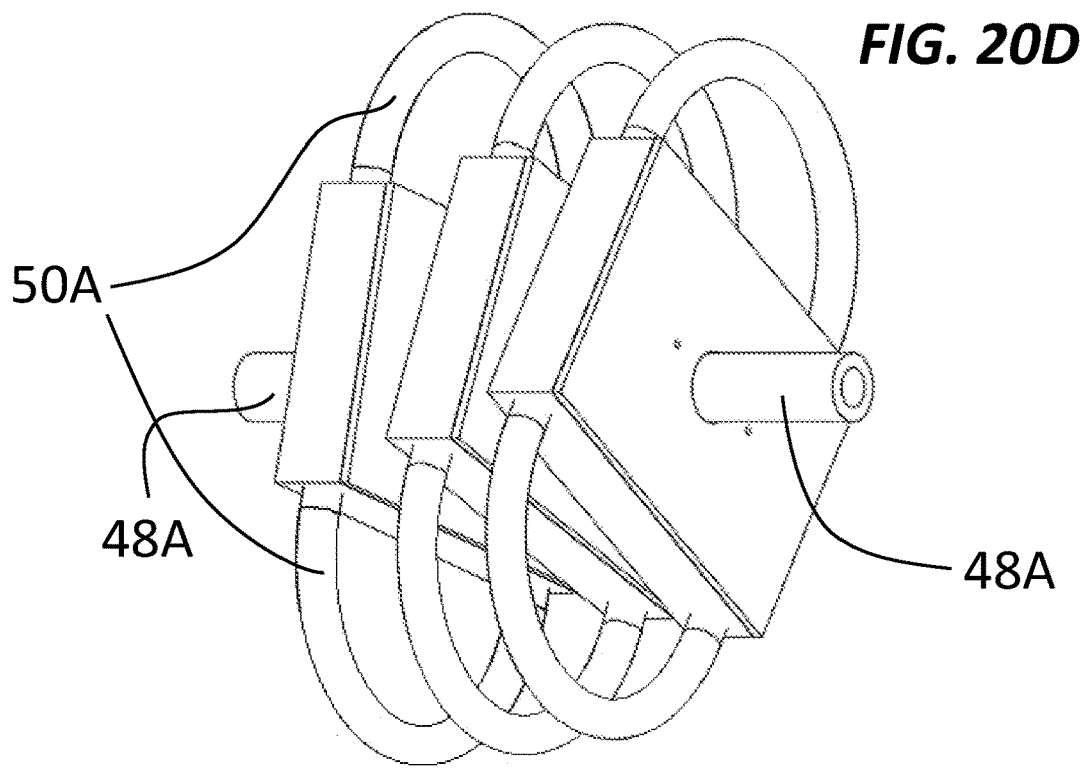
FIG. 20D illustrates an embodiment using multiple, stacked MBLM modules on a master boltlock bolt.

The master boltlock bolts 48A through 48E, having no presumable end allow for the stacking of any desired amount of MBLM 10 modules 12 as seen in FIG. 20D. By inserting the master boltlock bolt 48A through 48E through the master boltlock receiver cavity 42 the driver bearing(s) 16 are compressed into track bearings 14 in the bearing track 18, providing modules 12 lockability at all bossbolt locking ports 40. When the master boltlock bolt 48E is slidably removed from the master boltlock receiver cavity 42, all the modules 12 are unlocked and released. Referring to FIG. 14, the master boltlock receiver cavity 42 goes through the entire lock body, this allows for the insertion of an adequately sized rope, cable, et cetera through the master boltlock receiver cavity 42 compressing the driver bearing (s) 16 into the track bearings 14, providing lockability; removing the rope/cable/etc. releases the driver bearing(s) 16 thus releasing the bossbolt locking ports 40. Another embodiment uses the master boltlock dimpled lock release 48F present on the master boltlock bolt 48A through 48D, which is rotatable in the master boltlock receiver cavity 42 of the MBLM 10 module 12 seen in FIG. 17A-17D and unlocks when the driver bearing(s) 16 are aligned with the master boltlock dimpled lock release 48F. It is further noted that the master boltlock bolt 48B is designed to be rotated to lock/unlock the driver bearing(s) 16 in the master boltlock receiver cavity 42 unlocking a module(s) 12. In another embodiment a key is not required to rotate 48B as seen in FIG. 17B.

Figure 7:
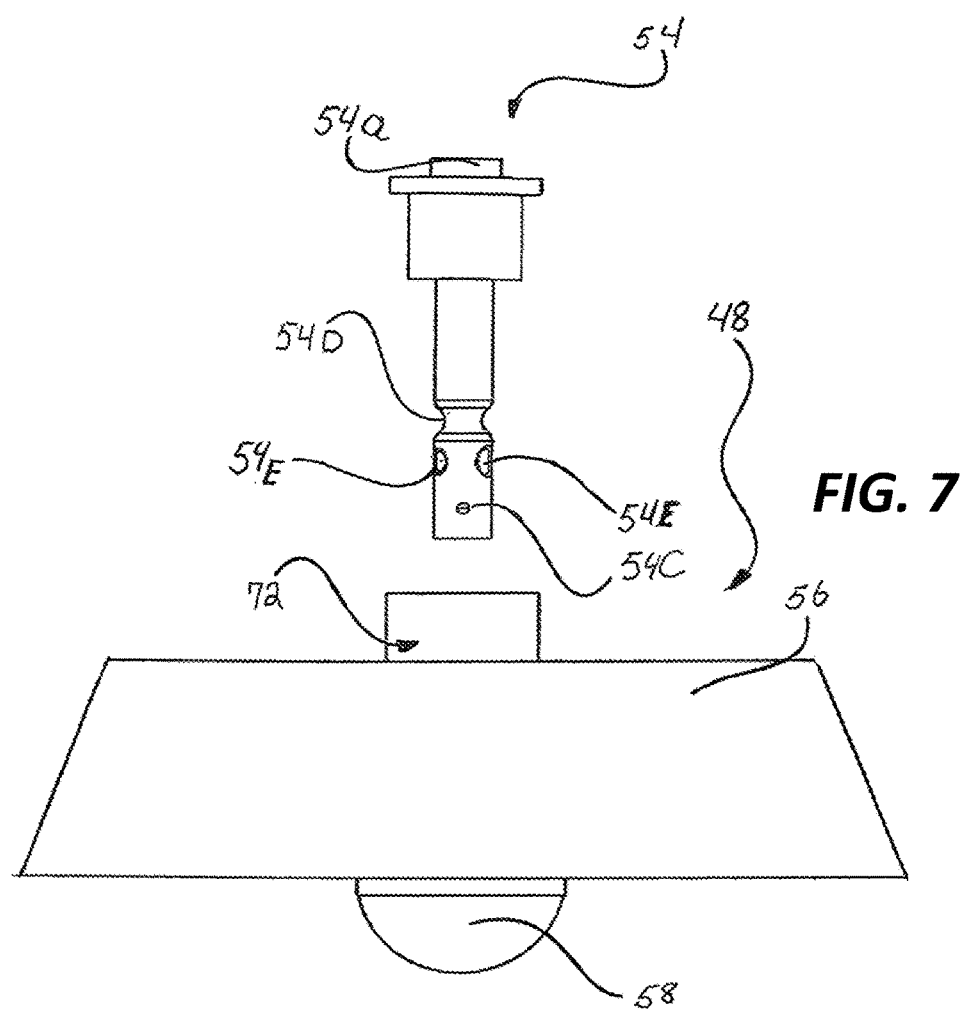
FIG. 7 illustrates a side view of the master boltlock vault with boltlock dimple key extruder outside the master boltlock vault in the unlocked position.
Figure 8:
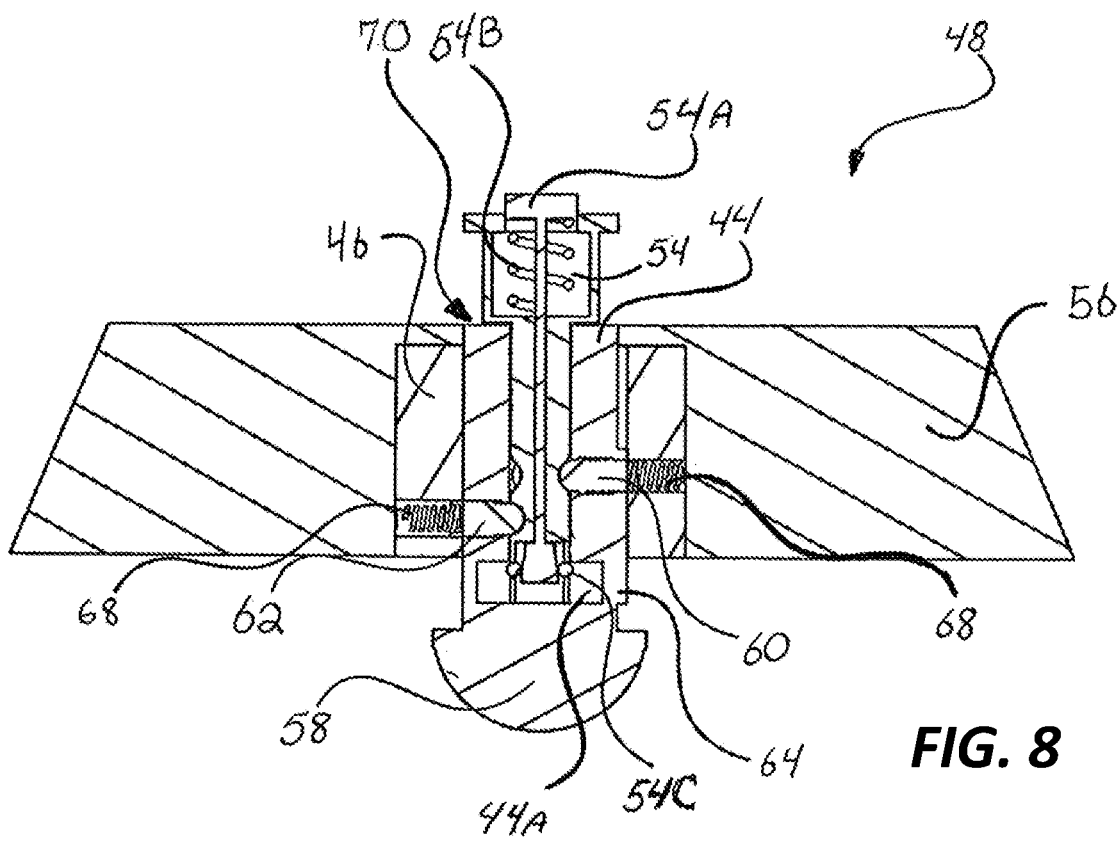
FIG. 8 illustrates a cross-sectional view of the master boltlock vault with boltlock dimple key extruder inside the master boltlock vault in the locked position.
Figure 9:
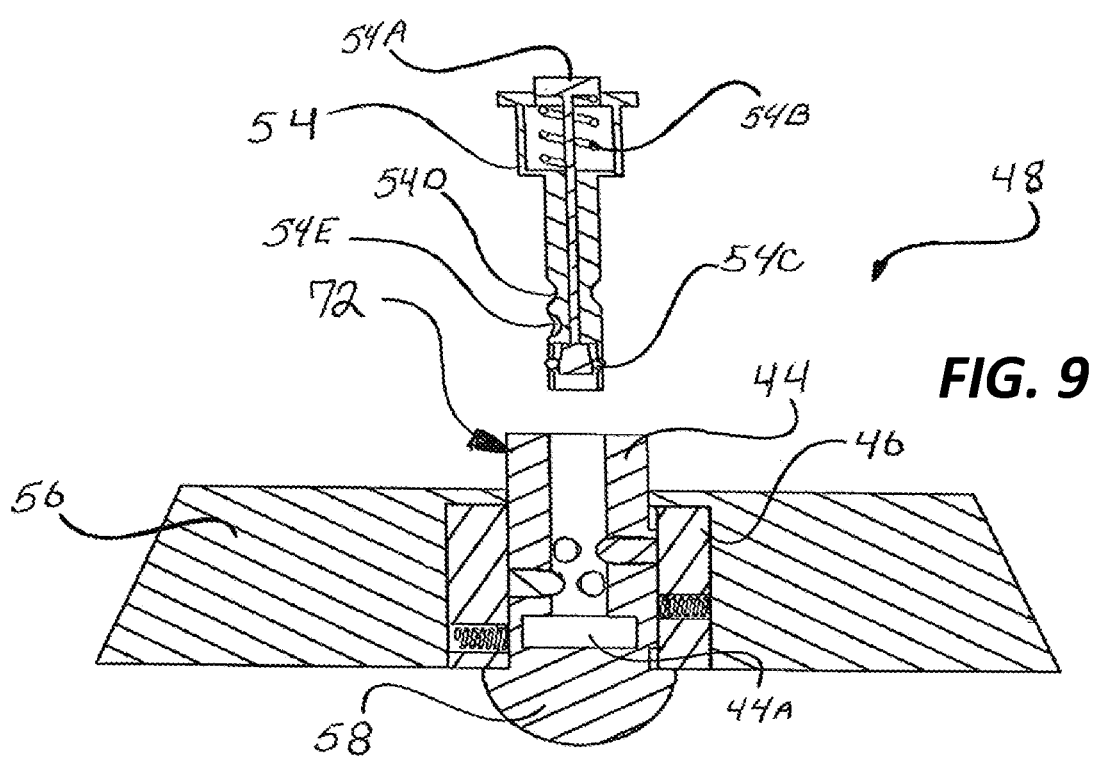
FIG. 9 illustrates a cross-sectional view of the master boltlock vault with boltlock dimple key extruder outside the master boltlock vault in the unlocked position.
Figure 16:
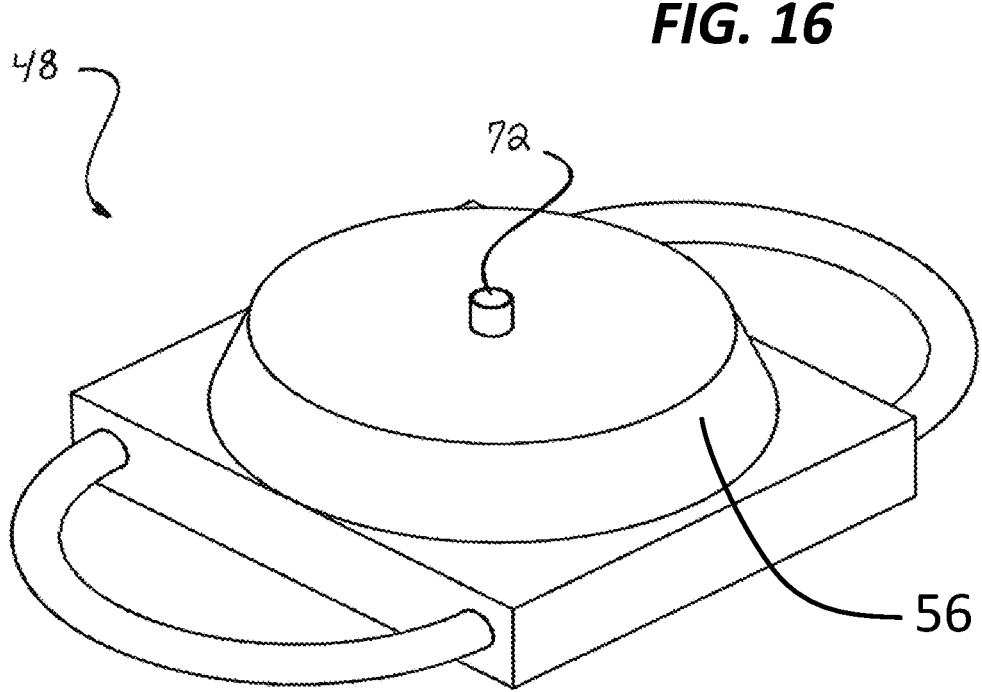
FIG. 16 illustrates a perspective view of the MBLM module double shackle padlock embodiment with the master boltlock vault in the vault cover in the unlocked position.
Figure 17:
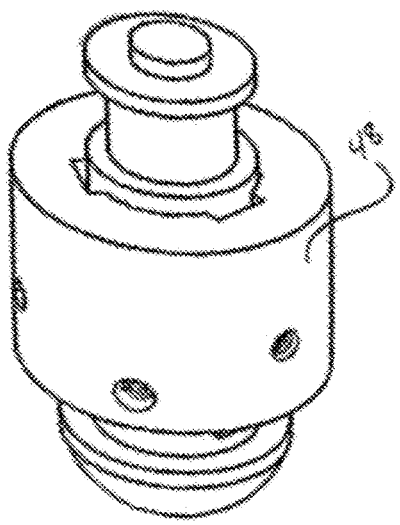
FIG. 17 illustrates the side-view of a master boltlock vault.
Figure 17A:
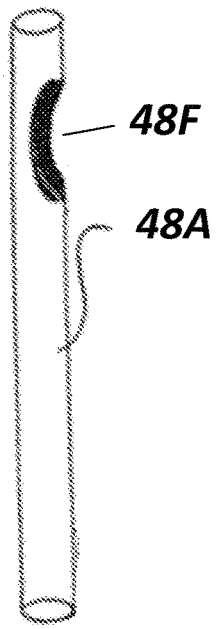
FIG. 17A illustrates the side-view of a master boltlock bolt (A)
Figure 17B:
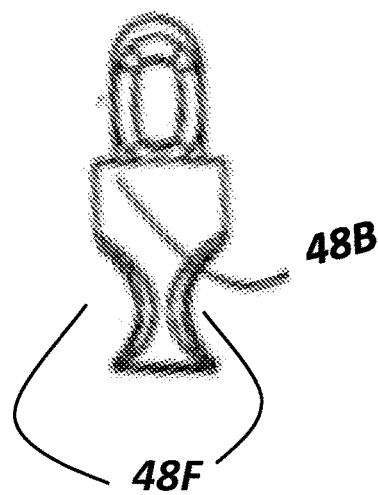
FIG. 17B illustrates the side-view of a master boltlock bolt (B)

Another embodiment as seen in FIGS. 8 and 9 uses a master boltlock vault 48, as seen in FIG. 17, the boltlock 44 is secured within the mortise lock 46 manifesting the boltlock (Locked Position) 70 as seen in FIGS. 6, 8, 15, and 20 providing lockability of the MBLM 10 modules 12. The boltlock 44 is unlocked from the mortise lock 46 via the boltlock dimple key extruder 54 when inserted into the boltlock 44, the boltlock (Unlocked Position) 72 is seen in FIGS. 7, 9, and 16. You must have the correct bitting on the boltlock dimple key extruder 54 to unlock the boltlock 44 from the mortise lock 46. The boltlock lock pins 62, and the boltlock security pins 60 need to align with the bits on the boltlock dimple key extruder 54; more specifically, the boltlock lock pins 62 align with bits for lock pins 54E and the boltlock security pins 60 align with the bits for security pins 54D in order to unlock. In more detail, the boltlock security pins 60 and boltlock lock pins 62 are actuated by the mortise springs 68 in the boltlock 44 which require for the bits for security pins 54D and bits for lock pins 54E on the boltlock dimple key extruder 54 to properly align unlocking the boltlock 44; however, if the boltlock security pins 60 are pressed upon at all due to improper alignment, they will cross over into the mortise lock 46 preventing vertical movement. Then, the master boltlock vault 48 is slidably pulled vertically and unlocked from the mortise lock 46 (boltlock (Unlocked Position) 72) as seen in FIGS. 7, 9, and 16 by pulling the boltlock dimple key extruder 54 outward, this releases the boltlock driver 58 from the master boltlock receiver cavity 42 as seen in FIGS. 3 and 3A, this releases the driver bearings 16 back into the master boltlock receiver cavity 42 thus decompressing the track bearings 14 in the bearing track 18 followed by the slidable boltlock blocks 20 unlocking all the crossbolts 22 from the crossbolt cavities 30 and bossbolt locking ports 40 in all of the MBLM 10 modules 12.

Figure 6:
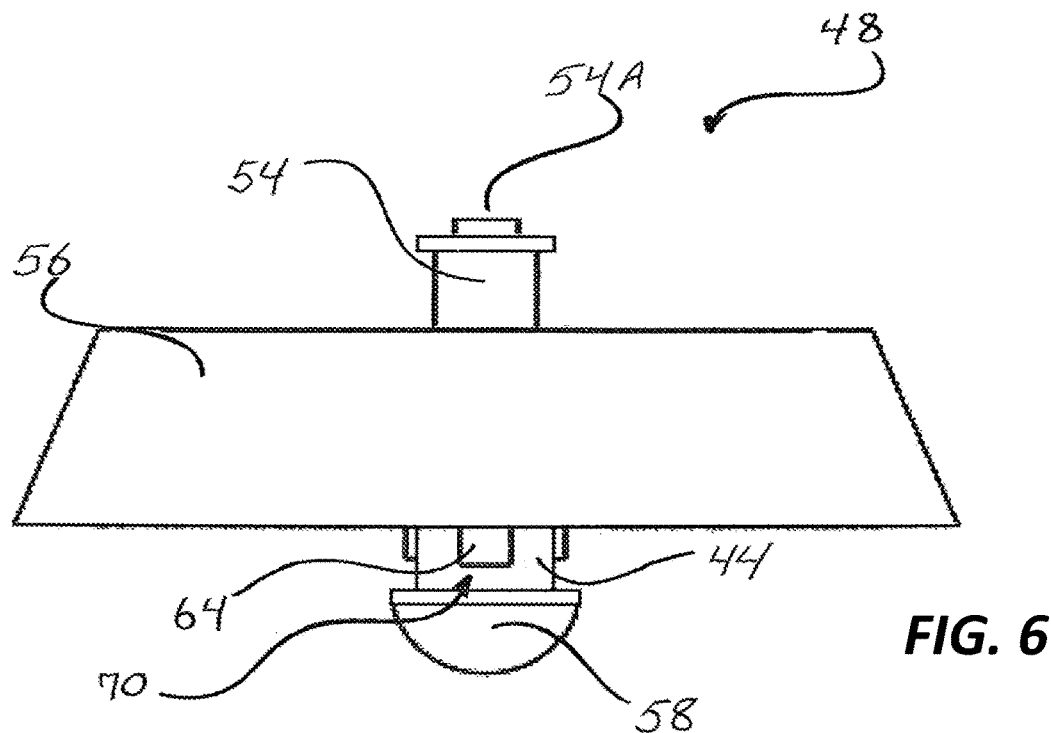
FIG. 6 illustrates a side view of the master boltlock vault with boltlock dimple key extruder inside the master boltlock vault in the locked position.

The boltlock 44 requires alignment stop guides 64, as seen in FIGS. 6 and 8 which are slidably aligned in the mortise lock 46 ensuring alignment by preventing rotation, the boltlock 44 is released and unlocked (boltlock (Unlocked Position) 72) when pulled out vertically from the mortise lock 46 as seen in FIGS. 7 and 9; for this reason the boltlock dimple key extruder 54 has a push button bearing release 54A, which is spring actuated by a push button spring 54B which releases the locking bearings 54C when pressed, the boltlock dimple key extruder 54 can access into the base of the boltlock 44 capturing the boltlock 44 inner cavity 44A, then the boltlock 44 can now be slidably removed vertically by pulling it outward releasing it from the mortise lock 46, unlocking all the MBLM 10 modules 12. The push button bearing release 54A is pushed once again and the boltlock dimple key extruder 54 is removed vertically from the boltlock 44 inner cavity 44A, positioning the boltlock 44 in the boltlock (Unlocked Position) 72 as seen in FIG. 7, 9. To relock the boltlock 44 simply push the boltlock 44 back into the mortise lock 46 manifesting the boltlock (Locked Position) 70 as seen in FIGS. 6, 8, 15, and 20, although it should be noted that no key is required to lock the boltlock 44 back into the mortise lock 46.

Figure 17C:
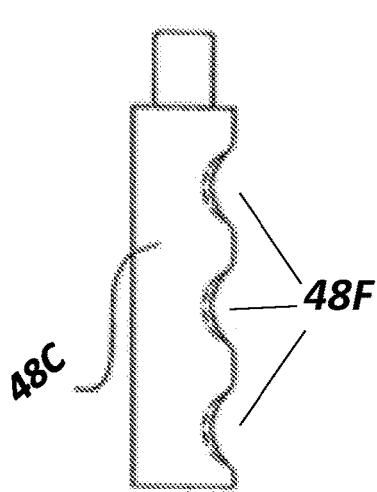
FIG. 17C illustrates the side-view of a master boltlock bolt (C)
Figure 17D:
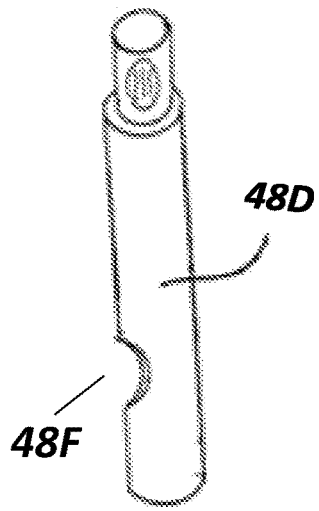
FIG. 17D illustrates the side-view of a master boltlock bolt (D)
Figure 17E:
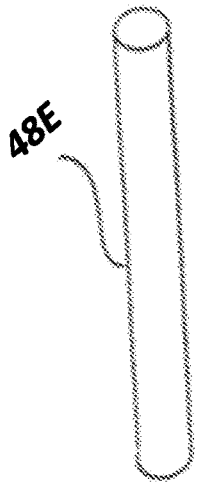
FIG. 17E illustrates the side-view of a master boltlock bolt (E) which does not have a master boltlock dimple lock release.
Figure 18:
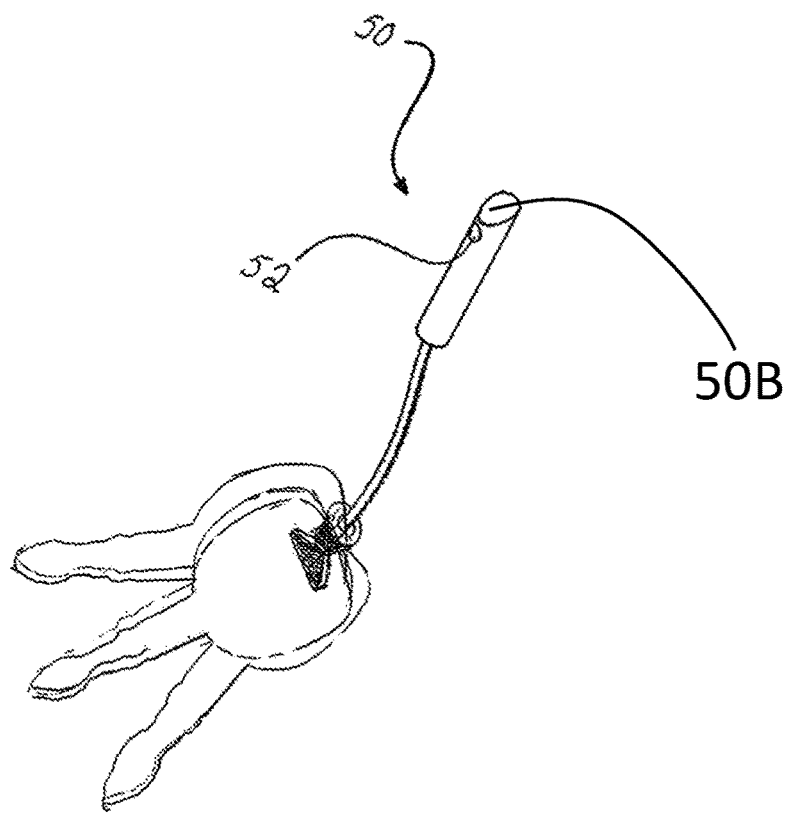
FIG. 18 illustrates a perspective view an embodiment of a bossbolt lockpoint with a set of keys.
Figure 19:
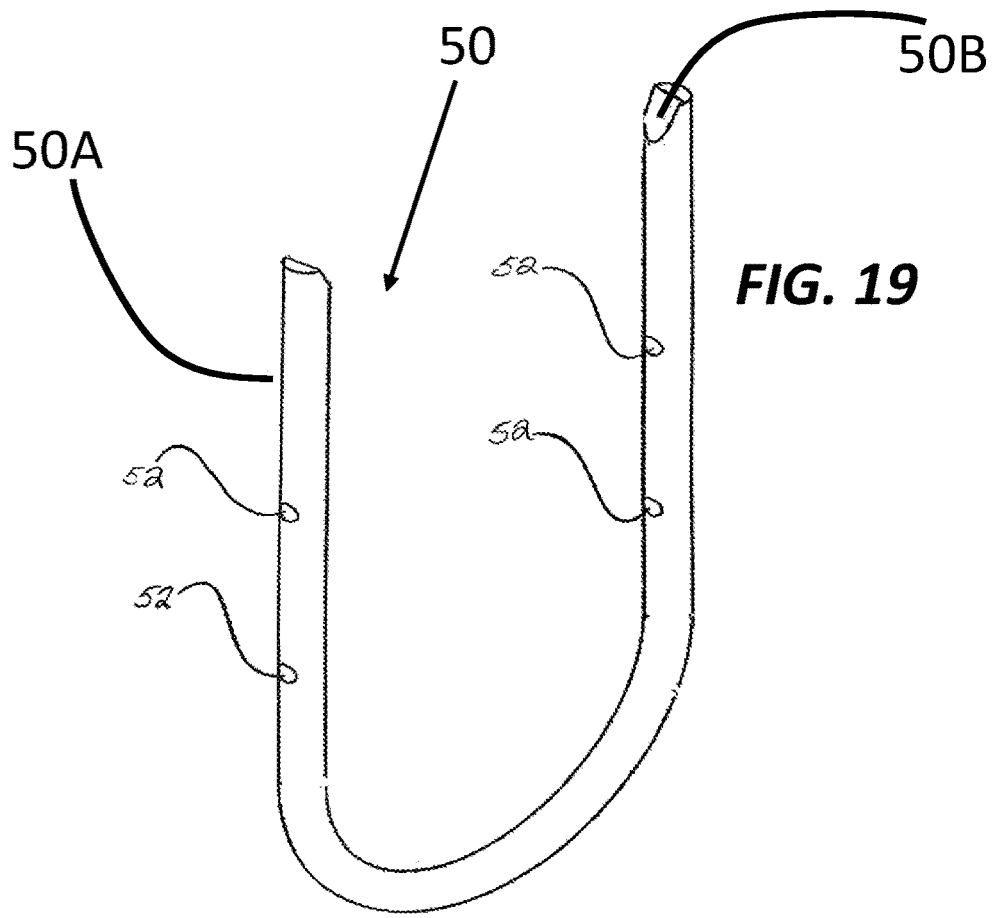
FIG. 19 illustrates a perspective view for a bossbolt shackle.

With all of the fundamentals of the present invention discussed, there are a few exemplary embodiments worth mentioning to provide a basic idea on the multitude of potential applications that the present invention offers. Referring to FIGS. 18 through 20D, starting with FIG. 18 showcases a bossbolt lockpoint 50 comprising of a bossbolt lockpoint cavity 52 and a beveled end 54 that secures a set of keys or any personal property thereof; here, it is made evident that a MBLM 10 module 12 is capable of locking virtually anything into the bossbolt locking port 40. In this case, the MBLM 10 module 12 such as one shown in FIG. 1 can serve as a hub of bossbolt locking ports 40 that can lock any of the bossbolt lockpoints 50 present, depending on desired application. Referring to FIG. 19, showcases a bossbolt shackle 50A comprised of a beveled end 50B and multiple bossbolt lockpoint cavities 52 inserted and secured into MBLM 10 modules 12 as seen in FIG. 20B, a gate lock where the MBLM 10 modules 12 and a gate lock catch 50C are secured by the bossbolt shackle 50A when locked, the bossbolt shackle 50A crosses over into the secured lock catch 50C note: the bossbolt shackle 50 A is secured by the MBLM 10 modules 12 preventing the gate from opening after entering into the secured lock catch 50C. The bossbolt shackle 50A in this case serves as a handle to unlock the gate once the MBLM 10 modules 12 are unlocked, hence being able to open the gate. Referring to FIG. 20, showcases a complete double shackle padlock embodiment that utilizes a master boltlock vault 48 as seen in FIG. 17 within a vault cover 56 in the boltlock (Unlocked Position) 72 as seen in FIGS. 7, 9, and 16. Referring to FIG. 20A showcases a chest that utilizes a MBLM 10 module 12 comprised of a master boltlock bolt 48B as seen in FIG. 17B to lock/unlock the MBLM 10 module 12, a bossbolt lockpoint 50 with beveled ends 50B, inserted into bossbolt locking ports 40 ensuring total lockability. Referring to FIG. 20C showcases a single shackle padlock embodiment. And in a more peculiar case, referring to FIG. 20D showcases a stack of MBLM 10 modules 12 that comprises a master boltlock bolt 48C as seen in FIG. 17C. It should be noted that the MBLM 10 modules 12 are designed to be used at any separated distance using the same boltlock bolt 48E.

The present invention has been described through an array of illustrated embodiments. Those with an adept imagination can derive ample variations from the embodiments provided without diverting from the scope of the present invention.

Therefore, as previously mentioned throughout, the embodiments provided do not limit the scope of the present invention as defined in the claims.

The invention claimed is:

1. A multiple bearing locking mechanism module comprising:
   a lock body;
   one or more driver bearings and at least two track bearings;
   a locking mechanism which compresses and decompresses the one or more driver bearings;
   at least two slidable boltlock blocks each with a crossbolt disposed therein;
   wherein the at least two crossbolts are capable of being actuated;
   wherein the at least two slidable boltlock blocks are capable of retracting when the one or more driver bearing are decompressed;
   wherein the at least two track bearings are in a bearing track, the at least two track bearings are pushed by the one or more driver bearings when compressed, moving the at least two track bearings transversely down the bearing tracks;
   wherein the at least two slidable boltlock blocks are each in direct contact with one of the at least two track bearings in the bearing track.

2. The multiple bearing locking mechanism according to claim 1, further comprising one or more modules centered around a master boltlock receiver cavity.

3. The multiple bearing locking mechanism according to claim 1, wherein bossbolt locking ports are secured by the at least two crossbolts positioned in the at least two slidable boltlock blocks.

4. The multiple bearing locking mechanism according to claim 1, wherein the locking mechanism is a rotatably slidable master boltlock bolt with a master boltlock dimpled lock release unlocking when aligned with the one or more driver bearings releasing bossbolt locking ports; wherein when the rotatably slidable master boltlock bolt is slidably moved in the master boltlock receiver cavity, the one or more driver bearings are compressed into a locked position.

5. The multiple bearing locking mechanism according to claim 4 further comprising the master boltlock bolt using a boltlock slidably disposed through the master boltlock receiver cavity that is in direct contact with the one or more driver bearings compressing the one or more driver bearings, and thereby pushing the at least two track bearings and the slidable boltlock blocks to an end of the bearing track into a locked state.

6. The multiple bearing locking mechanism according to claim 1, wherein the locking mechanism uses a master boltlock bolt and a master boltlock vault using a vertical pull boltlock from a mortise lock, the mortise lock using a boltlock dimple key extruder to unlock; wherein a boltlock is pushed back into the mortise lock to lock the multiple bearing locking mechanism.

7. The multiple bearing locking mechanism according to claim 6, wherein the master boltlock vault further comprises boltlock security pins and boltlock lock pins therein; wherein proper bitting of the boltlock dimple key extruder is required to align the boltlock security pins and the boltlock lock pins to be pulled vertically, decompressing the one or more driver bearings.

8. The multiple bearing locking mechanism according to claim 7, wherein if the boltlock security pins are displaced due to a result of nonalignment with bits of security pins on the boltlock dimple key extruder, the boltlock security pins are pressed into the mortise lock, preventing vertical movement.

9. The multiple bearing locking mechanism according to claim 1, wherein the locking mechanism is an adequately sized rope or cable that is slidably disposed through a master boltlock receiver cavity that compresses the one or more driver bearings, pushing the at least two track bearings and the at least two slidable boltlock blocks into a locked position.

10. The multiple bearing locking mechanism according to claim 1, wherein the locking mechanism is a conventional tumbler mortise keylock attached to a boltlock that is disposed in a master boltlock receiver cavity, wherein upon rotation, compresses the one or more driver bearings, pushing the at least two track bearings and the at least two slidable boltlock blocks into a locked position; and wherein when reversing the rotations of the conventional tumbler mortise keylock, the one or more driver bearings, the at least two track bearings, and the at least two slidable boltlock blocks return to an unlocked position.

11. The multiple bearing locking mechanism according to claim 2, wherein the locking mechanism is a boltlock slidably disposed through center cores of the one or more modules.

12. The multiple bearing locking mechanism according to claim 1, wherein actuating the crossbolts includes each of the at least two slidable boltlock blocks having a slidable crossbolt cavity magnet that repels from a slidable boltlock fixed magnet to actuate the crossbolts.

13. The multiple bearing locking mechanism according to claim 1, wherein retracting the at least two slidable boltlock bolts into an unlocked position comprises fixed magnets on each of the at least two slidable bolt blocks facing one another with repelling poles while having a magnetic attraction to apparatus magnets through the two or more track bearings in the bearing track wherein when the one or more driver bearings are decompressed, a magnetic switch apparatus magnetically assists in the retraction of the one or more driver beatings, the at least two track bearings, and the at least two slidable boltlock blocks, returning them to an unlocked position.

14. The multiple bearing locking mechanism according to claim 13, wherein the magnetic switch apparatus is an embedded magnet switch apparatus.

15. The multiple bearing locking mechanism according to claim 1, wherein actuating the at least two crossbolts involves the at least two slidable boltlock blocks each comprising a cavity spring actuating the at least two crossbolts.

16. The multiple bearing locking mechanism according to claim 1, wherein retracting the at least two slidable boltlock blocks into an unlocked position comprises a return spring on each of the at least two slidable boltlock bolts that provide the force to retract the at least two slidable boltlock blocks and the at least two track bearings when the one or more driver bearings are decompressed.

17. A method comprising:
   providing a multiple bearing locking mechanism module comprising:
   a lock body;
   one or more driver bearings and at least two track bearings;
   at least two slidable boltlock blocks each with a crossbolt disposed therein;
   compressing and decompressing the one or more driver bearings via a locking mechanism;

actuating the at least two crossbolts;
retracting the at least two slidable boltlock blocks when the one or more driver bearings are decompressed;
pushing the at least two track bearings that are in a bearing track by the one or more driver bearings when compressed, moving the at least two track bearings transversely down the bearing tracks;
positioning the at least two slidable boltlock blocks in direct contact with the at least two track bearings.

* * * * *